Oct. 19, 1926.
D. D. EVANS
1,603,756
ATTACHMENT FOR BLOWING AUTOMOBILE HORNS
Filed Nov. 16, 1925
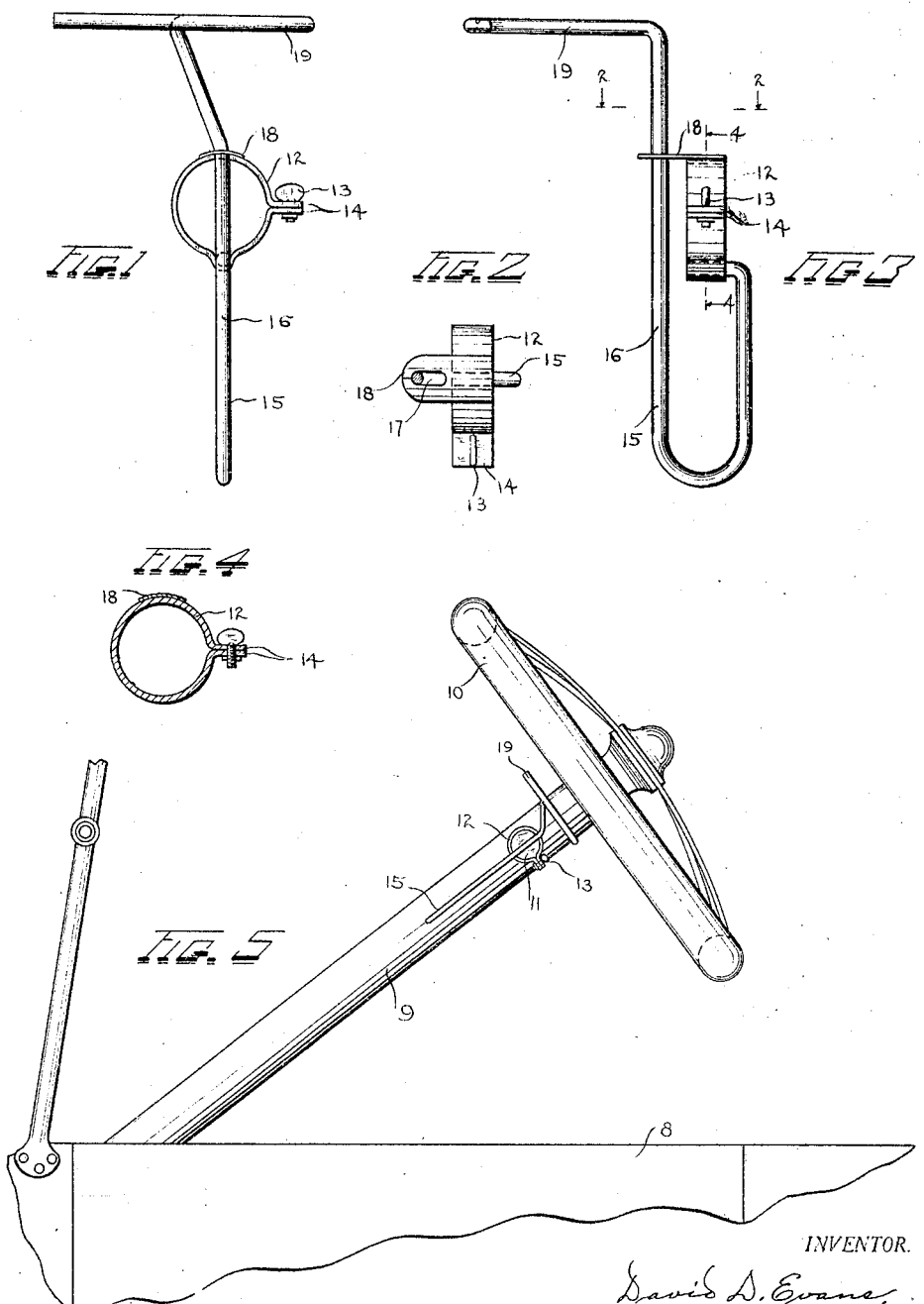
INVENTOR.
BY David D. Evans
Morsell, Keeney & Morsell
ATTORNEYS Patented Oct. 19, 1926.

1,603,756

UNITED STATES PATENT OFFICE.

DAVID D. EVANS, OF RACINE, WISCONSIN.

ATTACHMENT FOR BLOWING AUTOMOBILE HORNS.

Application filed November 16, 1925. Serial No. 69,552.

This invention relates to improvements in attachments for blowing automobile horns, and has for its primary object the provision of an attachment for a well-known make of automobile which will facilitate the operation of the horn thereof.

In Ford automobiles and other makes, the button for operating the horn is located on the side of the steering post below the steering wheel. Inasmuch as the operator's hands are required on the steering wheel to control the same and to manipulate the throttle and spark levers, said location of the horn button is very inconvenient and requires the removal of one hand from the steering wheel which is a dangerous, and sometimes impossible in practice.

It is, therefore, the principal object of the invention to provide a unitary attachment for a horn button which extends adjacent the steering wheel, making it possible to press the horn button and at the same time keep both hands on the steering wheel.

A further object of the invention is to provide a device of the class described with which an automobile of the type mentioned may be easily and quickly equipped without any alteration thereof.

A further object of the invention is to provide a device of the class described which is easily and readily operated.

A further object of the invention is to provide a device of the class described whose utility and cheapness of manufacture renders it a very marketable product.

A further object of the invention is to provide a device of the class described which is of very simple construction, is strong and durable, and is well adapted for the purpose described.

With the above and other objects in view the invention consists of the improved attachment for blowing automobile horns and its parts and combinations as set forth in the claims and all equivalents thereof.

In the accompanying drawing in which the same reference characters indicate the same parts in all of the views:

Fig. 1 is a front view of the improved horn blowing attachment;

Fig. 2 is a view taken on line 2—2 of Fig. 3;

Fig. 3 is a side view of the device;

Fig. 4 is a sectional view taken on line 4—4 of Fig. 3; and

Fig. 5 is a fragmentary view of an automobile showing the device attached for operating the horn button.

Referring now more particularly to the drawing it will appear that the numeral 8 designates an automobile of a well-known make having a steering post 9 with a steering wheel 10 mounted thereon.

A push button 11, for controlling the operation of the vehicle horn, is located on the left side of the post 9, immediately below the wheel 10.

The invention resides particularly in a device for manually operating said push button 11 and comprises a circular clamping member 12 adapted to encircle the button socket and to be adjustably clamped thereto by a wing screw 13 which passes through and joins the flanged end portions 14 of the clamping member 12.

Secured to the lower portion of the member 12 is a yielding rod or lever 15, shaped as shown in Fig. 2 to form a looped portion. The elongated vertical shank 16 of the looped portion extends through a slot 17 provided therefor in a flange 18 extending laterally from the top of the clamping member 12. The portion of the shank 16 above the flange 18 is off-set or bent forwardly, as shown in Fig. 1, to provide clearance for the spark lever of the vehicle and terminates in a horizontal handle portion 19 of T formation disposed immediately below the rim of the steering wheel 10 on the left side. It should be observed that the shank portion 16 and handle 19 are yieldingly movable with respect to the rest of the device and lateral movement of the shank is permitted by the elongated slot 17 through which it passes.

In operation, the button 11 normally projects beyond the outer edge of the clamping member 12 and the yielding shank portion 15 is there adjacent. To operate the horn it is merely necessary for the operator to press the handle portion 19 with his fingers, while his hand is on the wheel, and force the member inwardly. This will cause the shank to press against the button to blow the horn. Upon releasing the handle portion the shank will return to its normal position.

From the foregoing description it will be seen that the device is of very simple and novel construction, and is well adapted for the purpose set forth.

What I claim as my invention is:

1. A push button operator, comprising a ring shaped yoke adapted to be secured over and out of contact with the push button and having a flanged laterally extending and slotted portion, and a yieldable, vertically extending rod rigidly secured at one end to the yoke and free at the other end, the medial portion of said rod being movable in the slotted portion of said flange.

2. A push button operator, comprising a ring shaped yoke, adapted to be secured over and out of contact with the push button and having a flanged laterally extending and slotted portion, and a yieldable rod rigidly secured at one end to the yoke and free at the other end, the rod being looped and having an elongated shank portion extending through said slotted flange and terminating at its upper end in a right angular handle portion.

In testimony whereof, I affix my signature.

DAVID D. EVANS.